United States Patent [19]

Nagumo et al.

[11] Patent Number: 4,509,481
[45] Date of Patent: Apr. 9, 1985

[54] INTERNAL COMBUSTION ENGINE WITH COOLING SYSTEM

[75] Inventors: Shinichi Nagumo, Yokohama; Hiromichi Ofuji, Yokosuka; Kazuyuki Miisho, Yokohama, all of Japan

[73] Assignee: Nissan Motor Co., Ltd., Yokohama, Japan

[21] Appl. No.: 573,724

[22] Filed: Jan. 25, 1984

[51] Int. Cl.³ ............................. F02P 5/04; F01P 7/14
[52] U.S. Cl. .................................... 123/407; 123/421; 123/41.02; 123/41.05; 123/41.08
[58] Field of Search ............... 123/41.02, 41.05, 41.08, 123/407, 421

[56] References Cited

U.S. PATENT DOCUMENTS 3,521,610  7/1970  Coudriet ............................. 123/407
3,851,629  12/1974  Mayr ................................. 123/41.02
4,399,776  8/1983  Shikata ............................. 123/41.08

Primary Examiner—Ronald B. Cox
Attorney, Agent, or Firm—Schwartz, Jeffery, Schwaab, Mack, Blumenthal & Koch

[57] ABSTRACT

An internal to be at engine is provided with an engine cooling system by which the amount of cooling water introduced to a radiator is changed in accordance with engine load, so that the temperature of the cooling water is controlled to be at lower levels during a high engine load mode operation than during a low engine load mode operation. Additionally, an ignition timing control system of the engine is arranged to retard the ignition timing for a time period immediately after engine operation is shifted to the high engine load mode, thereby effectively preventing engine knock from arising when the engine operation is shifted to the high engine load mode.

18 Claims, 5 Drawing Figures

INTERNAL COMBUSTION ENGINE WITH COOLING SYSTEM

BACKGROUND OF THE INVENTION

1. Field of the Invention

This invention relates to an improvement in an internal combustion engine provided with an engine cooling system, to prevent engine knock from arising particularly when engine operation is shifted to a high engine load mode.

2. Description of the Prior Art

In connection with water-cooled internal combustion engines, engine cooling is in general accomplished in such a manner that heat generated by the engine is transferred to circulating cooling water which absorbs the heat, and the thus absorbed heat is released to ambient air through a radiator under the influence of cooling air flow. In the engines of the above-mentioned type, it is known that the upper limit of the cooling water is controlled in accordance with engine load in order to reduce the loss in engine power output and improve engine driveability.

However, in the thus arranged engines, engine knock tends to arise immediately after the engine operation is shifted to a high engine load mode. In order to prevent this engine knock, it has been proposed to retard ignition timing, for example, by means of a vacuum advance mechanism; however, this allows a continuous ignition timing retardation throughout the high engine load mode operation, thereby deteriorating fuel economy and engine driveability after the engine cooling has sufficiently progressed, to the point where there is no possibility of raising engine knock.

SUMMARY OF THE INVENTION

An internal combustion engine is provided with an engine cooling system including a radiator and water jackets. The engine cooling system is so arranged that the amount of cooling water introduced from the water jackets to the radiator is changed in accordance with engine load, so that the temperature of the cooling water during high engine load mode operation is controlled to lower levels than during low engine load mode operation. Additionally, the engine is provided with an ignition timing control system by which the ignition timing of the engine is retarded relative to a predetermined ignition timing only for a time period immediately after the engine operation is shifted to the high load engine mode. This effectively and sufficiently prevents engine knock arising due to high engine temperature at an engine operating shift to the high engine load mode. Besides, normal ignition timing is maintained after engine cooling has progressed to the point where there is no possibility of engine knock arising, thereby attaining improved fuel economy and engine driveability.

BRIEF DESCRIPTION OF THE DRAWINGS

The features and advantages of the internal combustion engine according to the present invention will be more clearly appreciated from the following description taken in conjunction with the accompanying drawings in which like reference numerals designate corresponding parts and elements, and in which.

DETAILED DESCRIPTION OF THE INVENTION

Figure 1:
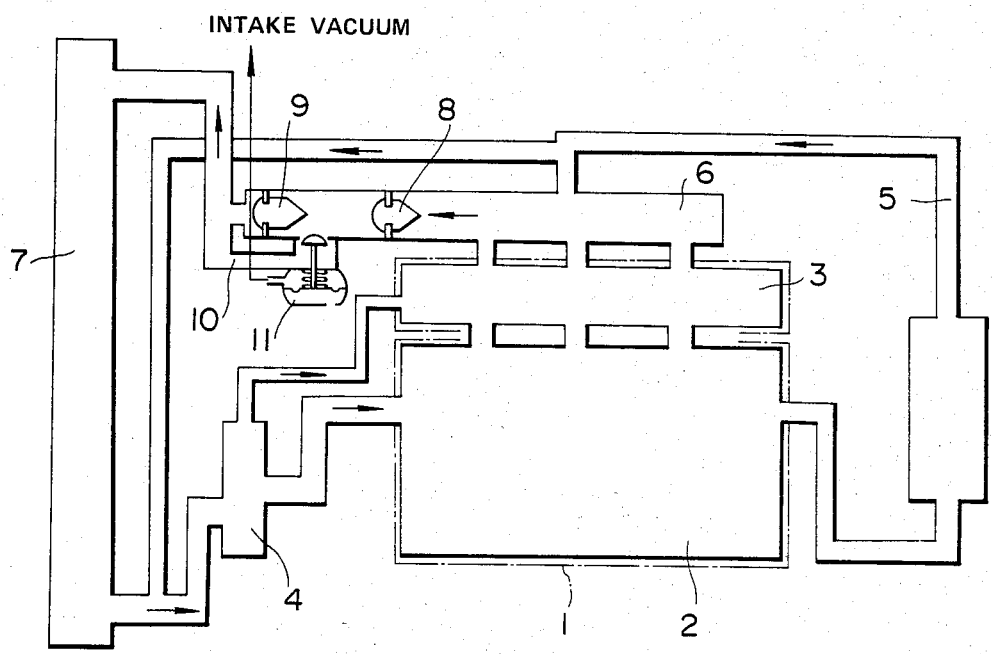
FIG. 1 is a schematic illustration of a conventional cooling system used in an internal combustion engine.

Referring to FIG. 1, a conventional engine cooling system for an internal combustion engine will be described along with its major shortcomings. The engine cooling system includes a cylinder block side water or coolant jacket 2 formed in a cylinder block of an engine body 1. The cylinder block side water jacket 2 is communicable with a cylinder head side water or coolant jacket 3 formed in a cylinder head of the engine body 1. The water jackets 2, 3 are supplied with cooling water or engine coolant under pressure by means of a water or coolant pump 4, so that heat generated from the engine body 1 is absorbed into the cooling water. A part of this cooling water is directly restored through a pipe 5 to the water pump 4, while the remaining part is introduced to a radiator 7 through a water or coolant jacket 6 formed in contact with an intake manifold (not shown).

The cooling water introduced into the radiator 7 is cooled under the influence of air flows generated by a cooling fan (not shown) and due to vehicle cruising, so that the heat of the cooling water is released to ambient air to accomplish heat exchange for the cooling water. The thus cooled cooling water is thereafter circulated to the water jackets 2, 3 under the action of the water pump 4, thereby cooling the engine body 1.

As shown, the water jacket 6 is provided thereinside a lower temperature responsive thermostat valve 8 which opens when the temperature of the cooling water is relatively low, and a higher temperature responsive thermostat valve 9 which opens when the cooling water temperature is relatively high. The former thermostat valve 8 is located upstream of the latter thermostat valve 9. Additionally, a bypass passage 10 is branched off from the water jacket 6 between the thermostat valves 8 and 9. The bypass passage 10 is provided with a change valve 11 which is arranged to open or close in accordance with engine load or intake manifold vacuum in the case of FIG. 1.

Accordingly, the lower temperature responsive thermostat valve 8 opens to allow the cooling water to flow to the radiator 7 even when the cooling water temperature is lower than a predetermined low level. The higher temperature responsive thermostat valve 9 opens to allow the cooling water to flow to the radiator 7 when the cooling water temperature exceeds a predetermined high level. The change valve 11 opens to allow the cooling water to flow through the bypass passage 10 during a high engine load mode operation. As a result, the cooling water temperature is raised when the change valve 11 is closed, while the cooling temperature is lowered when the change valve 11 is opened.

Thus, when engine load is relatively low, i.e., during a low engine load mode operation, the cooling effect is weakened, thereby decreasing the heat loss of the engine and the power loss by driving the cooling fan (in case of the cooling fan of the electrically driven type). This raises the cooling water temperature within a range, for example, from 90 to 110° C. thereby improving fuel economy. In contract with this, when the engine load is relatively high; i.e., during a high engine load mode operation, cooling effect is increased to lower the cooling water temperature within a range, for example, from 60 to 80° C. thereby preventing overheating of the engine, and improving engine driveability. With the thus arranged cooling system, there often arises engine knock immediately after engine operation is shifted from a low engine load mode to a high engine load mode. This is because the raised temperature of the cooling water during the low engine load mode operation cannot be promptly lowered when the engine operation is shifted to the high engine load mode, so that thermal load is raised thereby causing engine knock.

In order to prevent the engine knock, it has been proposed to retard ignition timing in which, for example, the ignition timing is retarded by means of a vacuum advance mechanism when the opening degree of a throttle valve exceeds a predetermined level during engine acceleration or high power output engine operation.

However, such a ignition timing control mode allows a continuous ignition timing retardation throughout the high engine load mode operation, thereby promoting engine cooling. This results in degradation in fuel economy and driveability though there is no possibility of raising engine knock after engine temperature sufficiently lowers.

Figure 2:
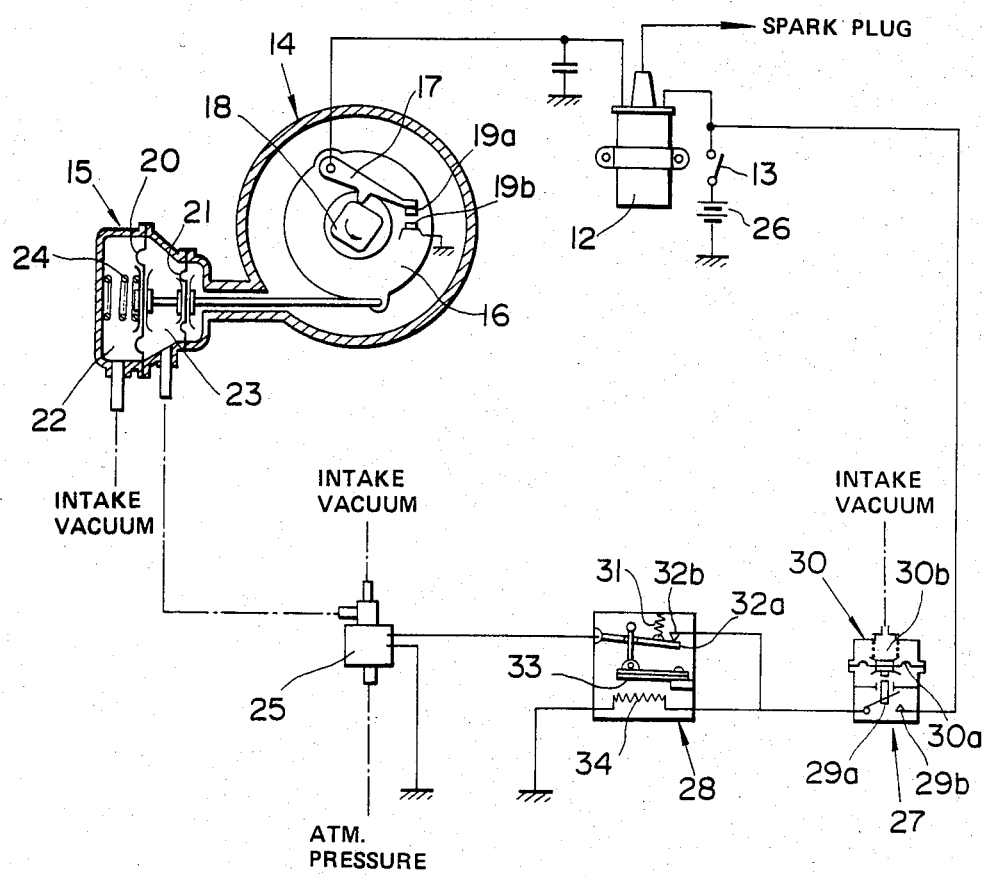
FIG. 2 is a schematic representation partly in section of an example of an ignition timing control system of an internal combustion engine according to the present invention.

In view of the above description of the conventional internal combustion engine, reference is now made to FIG. 2 wherein an example of an ignition timing control system forming part of an internal combustion engine according to the present invention is illustrated. The ignition timing control system shown in FIG. 2 is, in this case, used in combination with the engine cooling system shown in FIG. 1 to form an embodiment of the engine of the present invention. The engine is, as usual, provided with an ignition coil whose secondary winding is electrically connected to a spark plug (not shown). The primary winding of the ignition coil 12 is electrically connected through an ignition switch 13 to an electric source or battery 26. The primary winding of the ingnition coil 12 is further electrically connected to a breaker arm 17 of a contact breaker 14 forming part of an ignition distributor. The breaker arm 17 is pivotally mounted on a breaker plate 16. The breaker arm 17 is driven by a cam shaft 18 which is rotatable in synchronism with the revolution of the engine. Accordingly, under the action of the breaker arm 17, a pair of breaker points 19a, 19b are repeatedly brought into contact with and separated from each other, thereby generating a high voltage at the secondary winding of the ignition coil 12 which high voltage is supplied to the spark plug.

A diaphragm actuator 15 is provided to move the breaker plate 16 of the contact breaker 14 in such a manner that the breaker plate 18 rotates around the cam shaft 18. It will be understood that the rotation of the breaker plate 16 changes the ignition timing of the spark plug. The diaphragm actuator 15 includes first and second diaphragms 20, 21 which are disposed spaced from each other. The first diaphragm 20 is larger in surface area than the second diaphragm 21. The first diaphragm 20 defines a first vacuum chamber 22 which is supplied with an intake vacuum generated in an intake air passageway in the vicinity of a throttle valve (not shown) of the engine. A second vacuum chamber 23 is defined between the first and second diaphragms 20, 21. The first and second diaphragms 20, 21 are connected through a rod (no numeral) with each other, which rod extends to the contact breaker 14 and is connected to the breaker plate 16. A spring 24 is disposed in the first vacuum chamber 22 to urge the first diaphragm 20 rightward in the drawing, thereby causing the breaker plate 16 to rotate in the counterclockwise direction or the direction to retard the ignition timing relative to a predetermined ignition timing.

A three-way electromagnetic valve 25 is provided to supply the diaphragm actuator second vacuum chamber 23 with either one of intake manifold vacuum of the engine and atmospheric pressure. In other words, the diaphragm actuator second vacuum chamber 23 is communicable through the three-way electromagnetic valve 25 with the intake air passageway or atmospheric air. The valve 25 is so arranged as to establish communication of the diaphragm actuator second vacuum chamber 23 with atmospheric air when an electromagnet (not shown) of the valve 25 is de-energized, and establish communication of the same chamber 23 with the intake air passageway when the electromagnet of the valve 25 is energized upon being supplied with electric current from the battery 26. It will be understood that the second vacuum chamber 23 can be supplied with the intake manifold vacuum upon being communicated with the intake air passageway.

A vacuum switch 27 and a timer 28 are disposed in a circuit for electrically connecting the electromagnet of the valve 25 with the battery 26. The vacuum switch 27 includes a movable contact 29a and a stationary contact 29b which is electrically connected to the battery 26 through the ignition switch 13. The movable contact 29a is mechanically connected to a diaphragm member 30a of a diaphragm actuator 30. The diaphragm member 30a defines a vacuum chamber 30b which can be supplied with the intake manifold vacuum. The vacuum switch 27 is so arranged that the movable and stationary contacts 29a, 29b contact with each other to allow electric current to pass therethrough during a high engine load mode operation in which the intake manifold vacuum is relatively low or weaker, i.e., lower or weaker than a predetermined level (for example, 100 mmHg). Consequently, the vacuum switch 27 is closed during the high engine load mode operation.

The timer 28 includes a movable contact 32a which is electrically connected to the electromagnet of the valve 25 and normally biased to contact with a stationary contact 32b by means of a spring 31. The stationary contact 32b is electrically connected to the stationary contact 29a of the vacuum switch 27. A bimetal lever 33 is disposed to be engageable with the movable contact 32a. More specifically, the bimetal lever 33 is so operatively connected to the stationary contact 32b that the movable contact 32a separates from the stationary contact 32b when the bimetal lever 33 warps downward upon being heated. Disposed under the bimetal lever 33 is an electric heater 34 which is electrically connected to the movable contact 29a of the vacuum switch 27, so that the heater 34 functions to heat the bimetal lever 33 when supplied with electric current through the vacuum switch 27. It will be appreciated that the movable contact 32a separates from the stationary contact 32b when a predetermined time (for example, 4 to 8 seconds) elapses from a time point at which electric current supply to the heater 34 starts. As a result, the second vacuum chamber 23 of the diaphragm actuator 15 is supplied with the engine intake vacuum for a predetermined period of time immediately after engine operation is shifted to a low engine load mode.

In operation, during a low engine load mode operation, the first vacuum chamber 22 is supplied with the vacuum created in the intake air passageway in the vicinity of the throttle valve, so that the ignition timing is advanced relative to the predetermined ignition timing.

Thereafter, when the engine operation is shifted from the low engine load mode to a high engine load mode, the intake manifold vacuum is lowered or weakened to close the vacuum switch 27. Accordingly, electric current from the battery 26 is supplied to the electromagnet of the three-way electromagnetic valve 25, thereby allowing the diaphragm actuator second vacuum chamber 23 to be supplied with the intake manifold vacuum. At this time, the rod connecting the first and second diaphragms 20, 21 is moved leftward because of the surface area of the first diaphragm 20 being larger than that of the second diaphragm 21. This causes the breaker plate 16 to rotate in the clockwise direction, thus retarding the ignition timing relative to the predetermined ignition timing.

When the predetermined time elapses after the engine operation is shifted to the high engine load mode, the timer 28 blocks electric current supply to the electromagnet of the three-way electromagnetic valve 25, so that atmospheric pressure is introduced to the diaphragm actuator second vacuum chamber 23. As a result, the breaker plate 16 of the contact breaker 14 is allowed to rotate counterclockwise, thereby advancing the ignition timing.

Thus, according to the embodiment shown in FIG. 2, the ignition timing is retarded only for the predetermined time period (for example, 4–8 seconds) immediately after the engine operation is shifted from the low engine load mode to the high load engine mode. This effectively prevents engine knock arising due to high engine temperature immediately after the engine operation is shifted to the high engine load mode in internal combustion engines equipped with an engine cooling system of the type shown in FIG. 1. Furthermore, the ignition timing can be controlled in accordance with a normal predetermined schedule when engine cooling sufficiently progresses so that there is no possibility of engine knock arising, thereby improving fuel economy and engine driveability.

While the vacuum switch 27 has been shown and described to be operated under the influence of the intake manifold vacuum, it will be understood that the vacuum switch 27 may be supplied with venturi vacuum developed in a carburetor in order to be operated under the influence of the carburetor venturi vacuum. Otherwise, the switch 27 may be arranged to be electrically closed during the high engine load mode operation, in accordance with the opening degree of the throttle valve or the amount of engine intake air. Besides, it will be understood that the timer 28 using the bimetal lever 33 may be replaced with an electrically operated timer switch.

Figure 3:
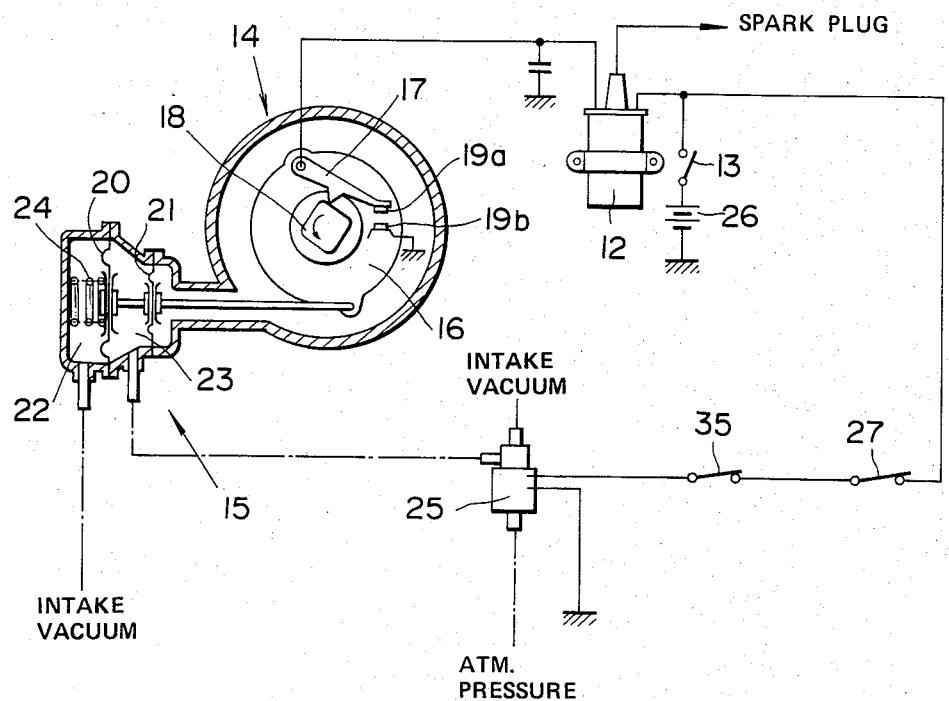
FIG. 3 is a schematic representation partly in section of another example of an ignition timing control system of the internal combustion engine according to the present invention.
Figure 5:
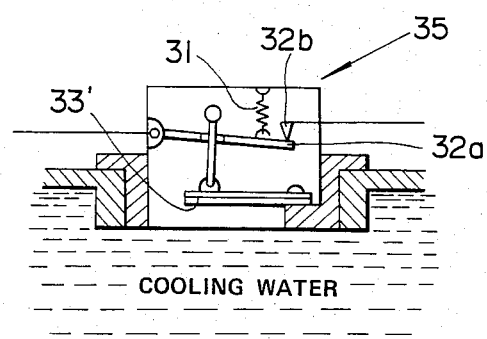
FIG. 5 is a schematic representation of a coolant temperature switch used in the ignition timing control system of FIG. 3.
Figure 4:
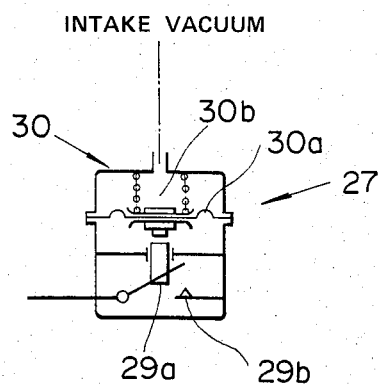
FIG. 4 is a schematic representation of a vacuum switch used in the ignition timing control system of FIG. 3.

FIGS. 3 to 5 illustrate another example of the ignition timing control system forming part of the engine according to the present invention, which is similar to the system as shown in FIG. 2 with the exception that a coolant temperature switch 35 is used in place of the timer 28. The coolant temperature switch 35 includes the movable contact 32a electrically connected to the electromagnet of the three-way electromagnetic valve 25 and urged to contact with the stationary contact 32b electrically connected to the movable contact 29a of the vacuum switch 27 under the action of the spring 31. Additionally, a bimetal lever 33' is disposed to be engageable with the movable contact 32a. The switch 35 is located in contact with the engine cooling water so that the bimetal lever 33' is responsive to the temperature of the engine cooling water. More specifically, the coolant temperature switch 35 is so arranged that the movable contact 32a is separated from the stationary contact 32b when the temperature of the engine cooling water drops below a predetermined level or upper limit (for example, 80° C.) of a predetermined temperature range set for the high engine load mode operation. In other words, the coolant temperature switch 35 is arranged to open to block electric current flow therethrough when the coolant temperature drops into the predetermined temperature range for the high engine load mode operation. The coolant temperature switch 35 may be of a thermo-wax type wherein the switch is actuated in response to the volume change of a wax.

Accordingly, when the engine operation is shifted from the low engine load mode to the high engine load mode, the engine intake vacuum supplied to the vacuum chamber 30b drops below the predetermined level and therefore the vacuum switch 27 is closed. This allows the diaphragm actuator second vacuum chamber 23 to be supplied with the intake manifold vacuum. Additionally, in this case, the engine is so arranged that the change valve 11 shown in FIG. 1 is opened simultaneously with the supply of the engine intake vacuum to the diaphragm actuator second vacuum chamber 23. The change valve 11 remains opened until the cooling water temperature drops below the predetermined level or upper limit of the temperature range for the high engine load mode operation.

With the arrangement of FIGS. 3 to 5, during the low engine load mode operation, the ignition timing is advanced relative to the predetermined ignition timing in the same manner as in the arrangement of FIG. 2. When the engine operation is shifted from the low engine load mode to the high engine load mode, the diaphragm actuator second vacuum chamber 23 is supplied with the intake manifold vacuum to retard the ignition timing relative to the predetermined ignition timing in the same manner as in the arrangement of FIG. 2, thus effectively preventing engine knock. During this time, engine cooling is simultaneously promoted under the action of the opened change valve 11. And when the temperature of the engine coolant drops below the predetermined level, the coolant temperature switch 35 opens to block electric current flow to the electromagnet of the three-way electromagnetic valve 25. This allows the diaphragm actuator second vacuum chamber 23 to be brought into communication with atmospheric air, thereby again making the ignition timing advance under the action of the intake vacuum supplied to the diaphragm actuator first vacuum chamber 22.

Thus according to the embodiment shown in FIGS. 3 to 5, when the engine operation is shifted from the low load engine mode to the high engine load mode, the retardation of the ignition timing is made and continued until the cooling water temperature drops below the predetermined level. This effectively and sufficiently prevents engine knock which tends to arise, in conventional engines, due to high engine temperature when the engine operation has been shifted to the high engine load mode. Besides, the ignition timing can be controlled in normal and predetermined schedules after the possibility of engine knock arising is removed upon the promoted engine cooling, thereby maintaining improved fuel economy and engine driveability.

What is claimed is:

1. An internal combustion engine having a radiator and coolant jackets, comprising:
    means for varying the amount of engine coolant introduced from the coolant jackets to the radiator in accordance with engine load; and
    ignition timing control means for retarding an ignition timing relative to a predetermined ignition timing only for a time period immediatly after engine operation is shifted to a high engine load mode.

2. An internal combustion engine as claimed in claim 1, wherein said varying means includes means for controlling the temperature of the engine coolant to be at lower levels during the high engine load mode operation than during a low engine load mode operation.

3. An internal combustion engine as claimed in claim 2, wherein said ignition timing control means includes means for retarding the ignition timing relative to the predetermined ignition timing for a predetermined time period immediately after the engine operation is shifted from the low engine load mode to the high engine load mode.

4. An internal combustion engine as claimed in claim 2, wherein said ignition timing control means includes means for retarding the ignition timing relative to a predetermined ignition timing for a time period in which the temperature of the coolant drops below a predetermined level.

5. An internal combustion engine as claimed in claim 3, wherein said ignition timing retarding means includes
    means for setting the ignition timing and taking a ignition timing retarding mode in which the ignition timing is retarded relative to the predetermined ignition timing when actuated,
    means actuating said ignition timing setting means to take said ignition timing retarding mode when operated,
    engine load responsive means capable of operating said actuating means when said engine load is higher than a predetermined level, and
    timer means capable of operating said actuating means for the predetermined time period immediately after said engine load becomes higher than the predetermined level.

6. An internal combustion engine as claimed in claim 5, wherein said ignition timing setting means includes a contact breaker having a breaker plate on which a breaker arm is pivotally mounted, said breaker plate being rotatable around a camshaft to change the relative location of said breaker arm to said camshaft, the ignition timing being retarded relative to the predetermined ignition timing when said breaker plate is rotated in a direction.

7. An internal combustion engine as claimed in claim 6, wherein said actuating means includes a diaphragm actuator having a diaphragm defining a vacuum chamber, said diaphragm being connected to said breaker plate of said contact breaker, said diaphragm causing said breaker plate to rotate in said direction when said vacuum chamber is supplied with an intake manifold vacuum, and an electromagnetic valve which is constructed and arranged to supply the diaphragm actuator vacuum chamber with the intake manifold vacuum when the electromagnet thereof is energized upon receiving electric current.

8. An internal combustion engine as claimed in claim 7, wherein said engine load responsive means is a vacuum switch constructed and arranged to close so as to supply electric current to the electromagnetic valve electromagnet when the intake manifold vacuum is below a predetermined level.

9. An internal combustion engine as claimed in claim 8, wherein said timer means is a timer switch electrically interposed between said vacuum switch and said electromagnetic valve electromagnet, and constructed and arranged to open so as to interrupt electric current flow from said vacuum switch to said electromagnetic valve electromagnet when a predetermined time elapses after said vacuum switch closes.

10. An internal combustion engine as claimed in claim 9, wherein said vacuum switch includes a diaphragm defining a vacuum chamber to be supplied with the intake manifold vacuum, a stationary contact electrically connectable to a battery, and a movable contact connectable with said diaphragm and contactable with said stationary contact.

11. An internal combustion engine as claimed in claim 10, wherein said timer switch includes a stationary contact electrically connected to said movable contact of said vacuum switch, a movable contact biased to contact with said stationary contact and electrically connected to the electromagnet of said electromagnetic valve, a bimetal lever engageable with said movable contact, and an electric heater electrically connected to said vacuum switch movable contact, said heater being located to heat said bimetal lever.

12. An internal combustion engine as claimed in claim 4, said ignition timing retarding means includes
    means for setting the ignition timing and taking a ignition timing retarding mode in which the ignition timing is retarded relative to the predetermined ignition timing, when actuated,
    means for actuating said ignition timing setting means to take said ignition timing retarding mode, when operated,
    engine load responsive means capable of operating said actuating means when said engine load is higher than a predetermined level, and
    temperature responsive means capable of operating said actuating means for the time period in which the temperature of the coolant drops below the predetermined level.

13. An internal combustion engine as claimed in claim 12, wherein said ignition timing setting means includes a contact breaker having a breaker plate on which a breaker arm is pivotally mounted, said breaker plate being rotatable around a camshaft to change the relative location of said breaker arm to said camshaft, the ignition timing being retarded relative to the predetermined ignition timing when said breaker plate is rotated in a direction.

14. An internal combustion engine as claimed in claim 13, wherein said actuating means includes a diaphragm actuator having a diaphragm defining a vacuum chamber, said diaphragm being connected to said breaker plate of said contact breaker, said diaphragm causing said breaker plate to rotate in said direction when said vacuum chamber is supplied with an intake manifold vacuum, and an electromagnetic valve which is constructed and arranged to supply the diaphragm actuator vacuum chamber with the intake manifold vacuum when the electromagnet thereof is energized upon receiving electric current.

15. An internal combustion engine as claimed in claim 14, wherein said engine load responsive means is a vacuum switch constructed and arranged to close so as to supply electric current to the electromagnetic valve electromagnet when the intake manifold vacuum is below a predetermined level.

16. An internal combustion engine as claimed in claim 15, wherein said temperature responsive means is a coolant temperature switch electrically interposed between said vacuum switch and said electromagnetic valve electromagnet, and constructed and arranged to open so as to interrupt electric current flow from said vacuum switch to said electromagnetic valve electromagnet when a predetermined time elapses after said vacuum switch closes.

17. An internal combustion engine as claimed in claim 15, wherein said vacuum switch includes a diaphragm defining a vacuum chamber to be supplied with the intake manifold vacuum, a stationary contact electrically connected to a battery, and a movable contact mechanically connectable with said diaphragm and contactable with said stationary contact.

18. An internal combustion engine as claimed in claim 17, wherein said coolant temperature switch includes a stationary contact electrically connected to said movable contact of said vacuum switch, a movable contact biased to contact with said stationary contact and electrically connected to the electromagnet of said electromagnetic valve, and a bimetal lever engageable with said movable contact and responsive to the temperature of the coolant.

* * * * *